March 17, 1959 R. ROY 2,877,482
VENETIAN BLIND DUSTER
Filed July 5, 1957
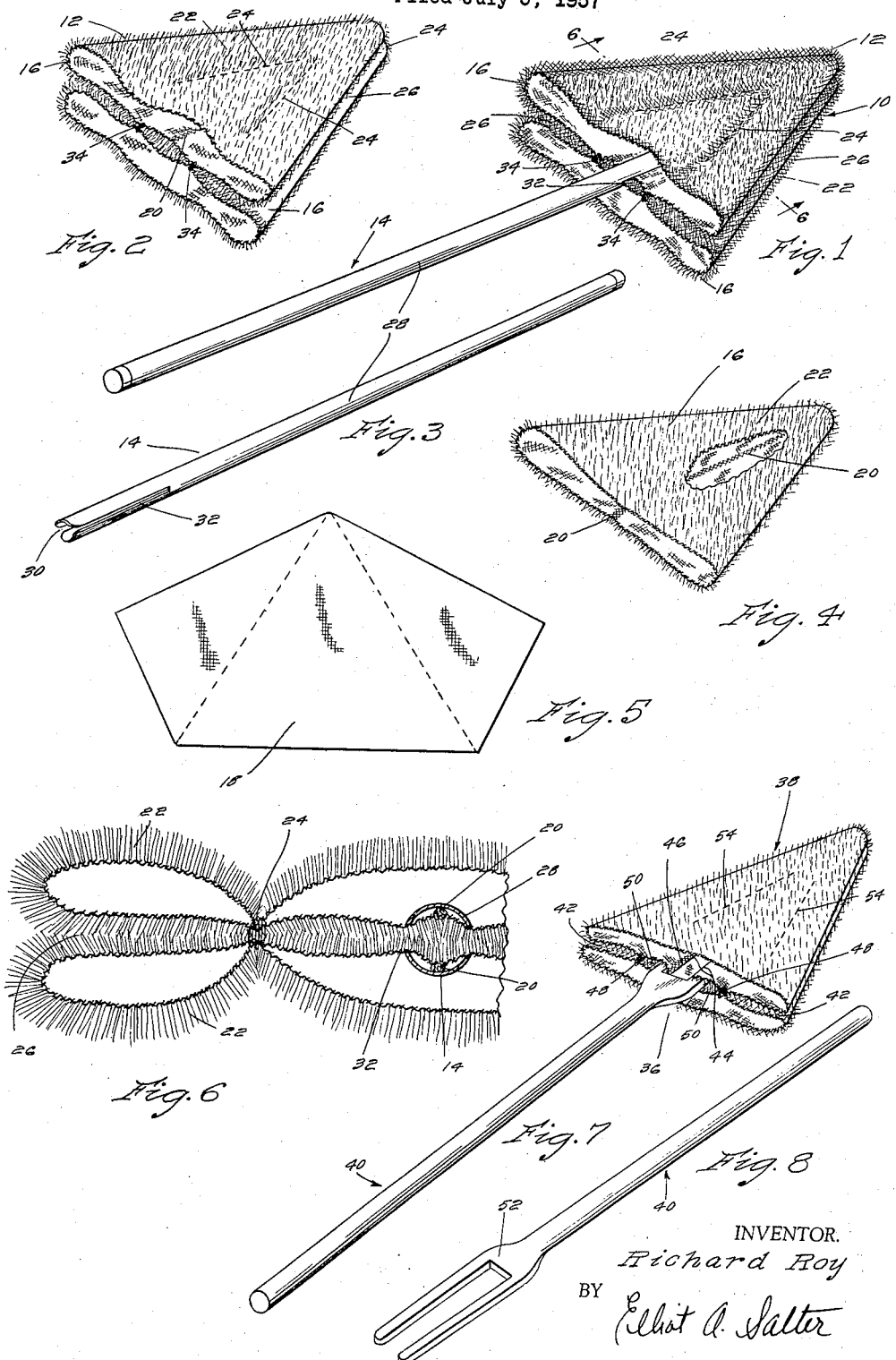
INVENTOR.
Richard Roy
BY Elliot A. Salter
Attorney.

United States Patent Office 2,877,482
Patented Mar. 17, 1959

2,877,482

VENETIAN BLIND DUSTER

Richard Roy, Central Falls, R. I.

Application July 5, 1957, Serial No. 670,300

5 Claims. (Cl. 15—210)

The present invention relates generally to cleaning equipment and more particularly to a novel and improved dusting device.

A primary object of the instant invention is the provision of a duster particularly adapted for use in connection with venetian blinds and the like.

Another important object of my invention is the provision of a duster specifically designed so as to be capable of simultaneously cleaning opposite surfaces of flat, slat-like elements such as venetian blinds.

Another object of the instant invention is the provision of a duster having novel and improved means for releasably attaching a handle thereto, whereby the handle may be readily removed whenever it is desired to clean or launder the duster proper.

Another object is the provision of a duster which when used to clean venetian blinds will simultaneously clean four different blind surfaces.

A further object is the provision of a duster which, although particularly adaptable for cleaning venetian blinds and the like, is nevertheless highly effective for general light dusting chores.

Still another object of my invention is the provision of a duster of the character described which is simple and economical to manufacture and durable and efficient in use.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a perspective view of my improved duster device with the handle attached thereto;

Fig. 2 is a perspective view of the duster portion per se;

Fig. 3 is a perspective view of the handle member per se;

Fig. 4 is a perspective view, partially broken away for purposes of illustration, showing one of the individual duster elements which make up the duster portion shown in Fig. 2;

Fig. 5 is a development of the duster element shown in Fig. 4;

Fig. 6 is a section, on an enlarged scale, taken on line 6—6 of Fig. 1;

Fig. 7 is a perspective view of a slightly modified form of duster device; and

Fig. 8 is a perspective view of the handle member utilized in the form of my invention shown in Fig. 7.

It has been found desirable to provide a small hand duster particularly adaptable for cleaning venetian blinds and the like, but which, nevertheless, may be employed to perform general light dusting duties. Therefore, there has been provided in accordance with the instant invention a duster which is provided with a marginal slot or groove around its peripheral edge whereby the duster is capable of simultaneously cleaning opposite surfaces of flat, slat-like members, such as venetian blinds. Also, novel and improved means are provided for releasably attaching the handle member to the duster portion whereupon the said handle may be easily and readily removed in order to facilitate cleaning of the said duster portion.

Referring now to the drawings, and more particularly to Fig. 1 thereof, there is shown generally at 10 a duster device conducted in accordance with my invention and comprising a duster portion 12 and a handle member 14. The duster portion 12 is constructed of any conventional highly dust-absorbent pile-fabric material, such as dynel fiber or lamb's wool, and comprises two individual duster elements 16 constructed and fastened together in a manner now to be described.

Referring to Figs. 4 and 5, the duster element 16 is made from a blank 18 which is folded and seamed as at 20 so as to provide a double-walled triangle with the pile-fabric surface 22 of the cloth outwardly disposed. As will be seen most clearly in Fig. 2, a pair of the duster elements 16 are assembled in face-to-face contact with their seams 20 disposed on adjacent and abutting surfaces. The elements are then stitched together as by the two rows of stitching 24, it being noted that the said stitching is inwardly spaced from the marginal periphery of the elements. Preferably, the stitching 24 extends completely through the four layers as shown most clearly in Fig. 6, and hence the said stitching not only secures the two elements 16 to each other, but at the same time, it also secures together the two walls of each individual element. As will be obvious, the stitching 24 will result in the provision of a marginal groove or slot 26 extending from the apex of duster portion 12 to the base edge thereof on each side.

The handle member 14 shown in detail in Fig. 3 comprises an elongated tube 28, preferably of aluminum or the like, open at one end as at 30 and having an elongated slot 32 extending from said open end. To assemble the handle 14 to duster portion 12, it is simply necessary to slide the open end 30 in over the oppositely disposed seams 20 until the inner end of the slot 32 abuts the base edges of the elements 16. Due to the thickness of the oppositely disposed seams 20 and the pile fabric surfaces disposed therebetween, the handle 14 will in effect be a press-fit when slid into the afore described operative position, and hence, the handle will remain in its assembled position until it is forceably removed, although it will be understood that in order to remove same, it is simply necessary to grasp the duster portion 12 with one hand and pull the handle 14 outwardly therefrom with the other. In practice, it has been found that the oppositely disposed seams 20 act as guide means during the sliding movement of handle 14 into duster portion 12 whereby to insure that the said handle will be centrally positioned with respect to the said duster portion and also to insure that the handle will remain so positioned during use of the device. If desired, the abutting base edges of the elements 16 may be stitched together on opposite sides of the seams 20 as at 34 whereby to facilitate the insertion of the handle member 14 by insuring that the oppositely disposed seams 20 are maintained in relatively close abutting relationship.

Although, as hereinbefore stated, it is desirable to extend the stitching 24 completely through the four individual layers which make up the duster elements 16, it will be understood that the said stitching could instead extend through and bind only the two surfaces of each individual duster element 16. In other words, in this form the stitching 24 would not hold the two individual elements 16 to each other at all, but rather this function would be accomplished by the stitching 34 and the handle member 14 when the latter is mounted and assembled in its operative position. While this form of my invention does not have the definitely defined groove or slot 26 which exists where the stitching 24 extends completely through the elements 16, it has been found that the handle 14 will effectively keep the elements 16 in closely abutting face-to-face relation so that the duster may be used in substantially the same way and with substantially the same degree of effectiveness. The advantage which exists in stitching the elements individually rather than to each other at 24 resides in the fact that after detachment from handle 14, the said elements may be swung apart or open about stitching 34 whereby to facilitate cleaning or laundering of the inside abutting pile-fabric surfaces 22.

In operation and use, the duster 10 may be used in normal fashion where general light dusting work is to be performed. On the other hand, when it is desired to clean venetian blinds and the like, it is simply necessary to run the duster portion along the edge of the individual slats so that the slat extends within the marginal groove or slot 26. As will be apparent, when the duster 10 is so utilized, the opposite surfaces of the slat or blind will simultaneously be cleaned, while at the same time, the under surface of the next higher slat and the upper surface of the next lower slat will also be cleaned, whereby four separate slat or blind surfaces are being dusted simultaneously with a single stroke. When the duster portion becomes dirty and in need of cleaning, it is simply necessary to remove the handle 14 therefrom whereby the said duster portion may be easily laundered or washed.

Referring now to Figs. 7 and 8, a slightly modified form of my invention is disclosed and will now be described. The modified form of my invention, shown generally at 36, comprises a duster portion 38 and a removable handle 40. In this form of my invention, the duster portion is made from a single piece of pile fabric, such as dynel, folded in upon itself along the side edges as at 42 to provide a marginal groove or slot similar to the slot 26 of the preferred form of my invention. As will be noted, the inner extremity of the central fold 42 is at 44, and, if desired, the seam 46 may be provided at one of said inner edges. The abutting edges of the folds 42 are stitched together as at 48 whereby to provide restricted openings 50 for receiving the handle 40, which has a flat bifurcated end portion 52 dimensioned to snugly fit within the said openings 50. Duster portion 38 may be additionally stitched at 54 in order to limit the depth of the marginal grooves, and at the same time imparting a higher degree of rigidity to the said duster portion.

In this embodiment, as well as in the first form of my invention, the handle member must be forced into the duster portion whereby to assemble the two parts, although it does not require a great deal of pressure to effect this assembly. Once assembled, however, the handle must be forceably removed from the duster portion if the two parts are to be separated for cleaning of the latter, etc., and in normal use they will not inadvertently become detached. The use of this form of my invention is identical to that hereinbefore described in that the duster may either be used in conventional fashion, or else it may be utilized to clean venetian blinds and the like by receiving the blind within its marginal edge or slot whereupon sliding movement of the duster lengthwise of the blind will automatically and simultaneously effect cleaning of the latter on both its opposite surfaces while at the same time cleaning the adjacent upper and lower surfaces of the next lower and upper slats, respectively, in the manner aforedescribed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claims.

I claim:

1. A cleaning device comprising a duster portion and a handle connected therewith, said duster portion comprising a pair of substantially identical flat triangular elements, each having a pair of superimposed walls closed along their side edges but open at the base edge, means securing said elements together in aligned face-to-face relation, said means being spaced from said side edges whereby to provide marginal slots therealong between the side edge portions of the abutting elements.

2. In the device of claim 1, said securing means comprising stitching extending through the four walls of the two elements.

3. In the device of claim 1, said handle comprising an elongated rod diametrically slotted at one of its extremities, said slot slidably receiving therein the two inside abutting walls of the duster portion.

4. In the cleaning device of claim 3, said rod being hollow and each of said inner walls having a butt seam extending from centrally of the base edge to the triangular apex, said seams providing guide means for the sliding movement of said handle during assembly and disassembly thereof.

5. A cleaning device having a duster portion comprising a pair of substantially identical flat triangular elements, each having a pair of superimposed walls closed along their side edges but open at the base edge, securing means connecting the abutting walls of the separate elements at their base edges, and a handle member detachably connected with said duster portion, said handle having a longitudinally extending slot at one of its extremities, said slot slidably receiving therein the said connected base edges and the said abutting walls whereby to releasably grip the said elements together in aligned, face-to-face relation.

References Cited in the file of this patent

UNITED STATES PATENTS

| | | |
|---|---|---|
| 823,725 | Hayden | June 19, 1906 |
| 2,686,327 | King | Aug. 17, 1954 |